(12) United States Patent
Dalton et al.

(10) Patent No.: US 11,634,329 B2
(45) Date of Patent: Apr. 25, 2023

(54) LIQUID-EXFOLIATED NANOMATERIALS

(71) Applicant: Advanced Material Development Limited, Guildford (GB)

(72) Inventors: Alan Dalton, Falmer Brighton (GB); Matthew Large, Falmer Brighton (GB); Sean Ogilvie, Falmer Brighton (GB)

(73) Assignee: Advanced Material Development Limited, Guildford (GB)

( * ) Notice: Subject to any disclaimer, the term of this patent is extended or adjusted under 35 U.S.C. 154(b) by 116 days.

(21) Appl. No.: 17/283,052

(22) PCT Filed: Oct. 11, 2019

(86) PCT No.: PCT/EP2019/077579
§ 371 (c)(1),
(2) Date: Apr. 6, 2021

(87) PCT Pub. No.: WO2020/074698
PCT Pub. Date: Apr. 16, 2020

(65) Prior Publication Data
US 2021/0371287 A1 Dec. 2, 2021

(30) Foreign Application Priority Data
Oct. 12, 2018 (EP) .................................... 18200075

(51) Int. Cl.
*C01B 32/19* (2017.01)
*C01G 39/06* (2006.01)
*B82Y 40/00* (2011.01)

(52) U.S. Cl.
CPC .............. *C01B 32/19* (2017.08); *C01G 39/06* (2013.01); *B82Y 40/00* (2013.01);
(Continued)

(58) Field of Classification Search
CPC ... C01B 32/19; C01B 21/0648; C01B 32/182; C01B 32/184; C01B 32/186;
(Continued)

(56) References Cited

U.S. PATENT DOCUMENTS

| 7,785,492 | B1 * | 8/2010 | Jang | ........................ | C01B 32/23 |
| | | | | | 252/378 R |
| 2002/0054995 | A1 * | 5/2002 | Mazurkiewicz | ........ | C01B 32/21 |
| | | | | | 241/5 |

(Continued)

FOREIGN PATENT DOCUMENTS

| CN | 206 970 222 | 2/2018 |
| WO | WO 2012/028724 | 3/2012 |

(Continued)

OTHER PUBLICATIONS

Bianco, et al., All in the graphene family—A recommended nomenclature for two-dimensional carbon materials, Carbon 2013; 65: 1-6 (Year: 2013).*

(Continued)

*Primary Examiner* — Daniel C. Mccracken
(74) *Attorney, Agent, or Firm* — Casimir Jones, SC; Robert A. Goetz

(57) ABSTRACT

Nanoplatelets are prepared from a 3D layered material by: providing a dispersion of the 3D layered material, pressurising the dispersion, rapidly depressurising the dispersion to create shear forces that exfoliate the 3D layered material into nanoplatelets; and/or providing a dispersion of the 3D layered material, forming a first flow of the dispersion along a first flowpath in a first direction, forming a second flow of the dispersion along a second flowpath in a second direction by reversing the first flow or by forming the second flow in a second flowpath, wherein the second flowpath is substantially reverse and non-coaxial with the first flowpath, whereby shear forces between material in the first flowpath (Continued)

and material in the second flowpath exfoliate the 3D layered material into nanoplatelets. Also provided are apparatuses for carrying out the invention and nanoplatelets obtained by the invention.

14 Claims, 5 Drawing Sheets

(52) U.S. Cl.
CPC ...... *C01P 2004/24* (2013.01); *C01P 2004/62* (2013.01); *C01P 2006/40* (2013.01); *C01P 2006/80* (2013.01)

(58) Field of Classification Search
CPC ... C01B 32/188; C01B 32/192; C01B 32/194; C01B 32/196; C01B 32/198; C01B 2204/00; C01B 2204/02; C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; C01B 32/23; C01G 39/06; B82Y 40/00; C01P 2004/24; C01P 2004/62; C01P 2006/40; C01P 2006/80
See application file for complete search history.

(56) References Cited

U.S. PATENT DOCUMENTS

| | | | |
|---|---|---|---|
| 2016/0276056 A1* | 9/2016 | Stolyarov | C09D 11/38 |
| 2017/0166449 A1* | 6/2017 | Yoo | C01B 32/19 |
| 2017/0305747 A1 | 10/2017 | Yang et al. | |
| 2018/0009667 A1* | 1/2018 | Yan | C01B 32/182 |
| 2018/0186643 A1 | 7/2018 | Liu et al. | |
| 2018/0214888 A1* | 8/2018 | Yoo | B01J 19/10 |
| 2018/0215622 A1* | 8/2018 | Yoo | C01B 32/21 |
| 2018/0312404 A1* | 11/2018 | Karagiannidis | C01B 32/19 |
| 2019/0284053 A1* | 9/2019 | Kim | B01J 19/006 |
| 2020/0122108 A1* | 4/2020 | Kim | C01B 32/19 |

FOREIGN PATENT DOCUMENTS

| | | |
|---|---|---|
| WO | WO 2014/001519 | 1/2014 |
| WO | WO 2014/140324 | 9/2014 |
| WO | WO 2015/184155 | 5/2015 |
| WO | WO 2017/060497 | 4/2017 |
| WO | WO 2017/089987 | 6/2017 |
| WO | WO 2019/135094 | 7/2019 |

OTHER PUBLICATIONS

International Preliminary Report on Patentability (Chapter II) for PCT/EP2019/077579.
European Search Report and Search Opinion for EP18200075.2.
Zhigang Shen et al, "Preparation of graphene by jet cavitation; Preparation of graphene by jet cavitation", Nanotechnology, 22(36), 2011, pp. 365306.

* cited by examiner

LIQUID-EXFOLIATED NANOMATERIALS

INTRODUCTION

This present invention relates to liquid-exfoliated nanomaterials, methods of forming such nanomaterials, and apparatuses for use in such methods.

BACKGROUND TO THE INVENTION

Two-dimensional (2D) materials are crystalline materials consisting of a few layers or even just a single layer (monolayer) of atoms or molecules. A wide range of 2D materials are known and include graphene, hexagonal boron nitride (h-BN), and transition metal dichalcogenides (TMDs). TMDs have the formula $MX_2$, wherein M is a transition metal and X is a chalcogen atom (S, Se or Te). Examples of such TMDs include molybdenum disulphide ($MoS_2$), niobium diselenide ($NbSe_2$) and tungsten disulphide ($WS_2$).

2D materials are known to have many interesting and potentially useful properties, which differ from the properties of the corresponding bulk 3D material. For example, graphene is highly conductive and has applications in electrode structures as well as in conductive composites. Similarly, hexagonal boron nitride is electrically insulating but has a large thermal conductivity and therefore has applications in thermal management. 2D molybdenum disulphide is a semiconductor which may be used in catalysis and has spectral features that are sensitive to the dielectric environment of the particulates making it particularly useful in sensing applications.

The interesting functional properties of many materials are often only observed when the materials are in their mono- or few-layer (i.e. 2D) forms. However, strong interlayer dispersion forces must be overcome in order to exfoliate bulk three-dimensional (3D) materials to form the corresponding 2D materials.

CN206970222U (Chengdu New Keli Chem Sci Co) describes a fluidized bed for the preparation of graphene using a ball mill.

US 2018/0186643 A1 (Chung Yuan Christian University) describes a method of exfoliating graphite by subjecting a dispersion of a graphite material to a pressure of greater than 800 bar and a temperature of 30° C. or less.

U.S. Pat. No. 7,785,492 B1 (Nanotek Instruments, Inc.) describes exfoliation of layered materials comprising firstly intercalating the layered material with a gas and then depressurising the gas-intercalated layered material in order to exfoliate the layered material.

WO 2012/028724 and WO 2014/140324 (Trinity College Dublin) both describe methods of exfoliating 3D layered materials by applying ultrasound to a dispersion of the layered material in a water-surfactant solution to form 2D layers or flakes. Processes based on sonication have yields of around 1% with a typical processing rate of approximately only 100 ml/hour. This batch process has a high energy cost and does not readily allow for scaling up to produce larger quantities of the 2D material.

WO 2017/060497 (Cambridge Enterprise Limited) describes a method for producing nanoplates derived from a layered material by passing a dispersion of the layered material at a pressure of at least 10 kpsi through a microfluidics channel. However, the use of a microfluidics system limits the throughput of the process (typically to less than 10 L/hr) and therefore the ability to scale up this process is also limited.

WO 2017/089987 (Fondazione Istituto Italiano Di Technologia) describes the use of wet-jet milling techniques to generate high shear forces needed to exfoliate layered materials. Whilst this process is able to operate on larger volumes of dispersions of layered materials (e.g. greater than 10 L/hour), the yield for this method is typically low (in the order of 0.01% to 0.1%).

There therefore remains the need for alternative, preferably high-capacity, preferably continuous methods of exfoliating 3D layered materials.

The Invention

The inventors of the present application have found that liquid jet homogenisation can be used to prepare dispersions of nanoplatelets (e.g. 2D materials), such as graphene. The process of liquid jet homogenisation is designed to develop high shear forces which drive the exfoliation of layered materials into few-layer and monolayer nanoplatelets. Using such a method, dispersions of nanoplatelets can be prepared at high throughput, e.g. a rate of 24 L/hr.

The inventors of the present invention have found that by pressurising a dispersion comprising a 3D layered material and then rapidly depressurising the dispersion, sufficient shear forces can be generated in order to exfoliate the 3D layered material to form 2D nanoplatelets.

The exfoliated graphene can then be formed into highly conductive films (e.g. films with a conductivity of approximately 50,000 S/m—as shown in the Examples below) for use in electronics applications. One example of such an application is in the preparation of antennas for RFID systems.

Accordingly, the invention provides a method of preparing nanoplatelets from a 3D layered material, comprising
providing a dispersion of the 3D layered material,
pressurising the dispersion,
rapidly depressurising the dispersion to create shear forces that exfoliate the 3D layered material into nanoplatelets.

The inventors have also found that shear forces can be created by causing flows of the dispersion to pass one another in substantially opposite directions. Again, such shear forces can exfoliate the 3D layered material in the dispersion to form 2D nanoplatelets.

Accordingly, the invention also provides a method for exfoliating 3D layered materials to form nanoplatelets, the method comprising:
providing a dispersion of the 3D layered material,
forming a first flow of the dispersion along a first flowpath in a first direction,
forming a second flow of the dispersion along a second flowpath in a second direction by reversing the first flow or by forming the second flow in a second flowpath substantially reverse and non-coaxial with the first flowpath,
whereby shear forces between material in the first flowpath and material in the second flowpath exfoliate the 3D layered material into nanoplatelets.

The two above-mentioned sources of shear forces can be combined in a single method to increase and preferably maximise exfoliation of the 3D layered material.

Accordingly, the invention further provides a method of preparing nanoplatelets from a 3D layered material, comprising
providing a dispersion of the 3D layered material,
pressurising the dispersion,
rapidly depressurising the dispersion to create shear forces that exfoliate the 3D layered material into nanoplatelets, forming a first flow of the dispersion along a first flowpath in a first direction, forming a second flow of the dispersion along a second flowpath in a second direction by reversing the first flow or by forming the second flow in a second flowpath substantially reverse and non-coaxial with the first flowpath, whereby shear forces between material in the first flowpath and material in the second flowpath exfoliate the 3D layered material into nanoplatelets.

In generating shear forces by depressurisation to cause exfoliation, the rate of the pressure drop is key and is referred to as rapid to indicate that the pressure change is sufficiently large and occurs over such a short distance and/or time period that exfoliation is achieved.

The term rapid (in relation to the rate of depressurisation) may mean that the pressure of the dispersion is reduced, for example reduced by at least 100 MPa (preferably by at least 120 MPa), over a distance of 2 cm or less (preferably 1 cm or less). Alternatively, the rate of depressurisation may be defined by the pressure change over time. In this case, rapid refers to a reduction in pressure of greater than 100 MPa (preferably greater than 120 MPa) over a time of 1.0 s or less, for example, 0.05 s or less, preferably 0.005 s or less, 0.5 ms or less or 0.05 ms or less (even more preferably 0.02 ms or less).

Rapid depressurisation of the dispersion may be caused by passing the dispersion through an aperture and into a chamber. According to the "Bernoulli effect", the pressure of a fluid is reduced in regions where its flow velocity is increased. By passing the dispersion (under a substantially constant pressure) through an aperture, its flow velocity is increased. Therefore, passing the dispersion through an aperture also decreases its pressure.

The aperture may be an opening in a wall of the chamber and is conveniently a nozzle leading into the chamber. The chamber is at a lower pressure than the pressure of the pressurised dispersion (for example at a pressure at least 100 MPa lower than the pressure of the dispersion). The chamber is typically at or about atmospheric pressure, meaning within 20 MPa, preferably 10 MPa of atmospheric pressure (101 kPa).

The dimensions of the aperture may be defined by its cross-sectional diameter as well as its length (i.e. the distance perpendicular to the opening along which the aperture is able to constrict fluid flow). When the aperture is an opening in a wall, the length of the aperture is the thickness of the wall. When the aperture is a nozzle, the length of the aperture is typically the length of the nozzle or the length of the nozzle where the cross-sectional diameter is at its minimum.

A shorter aperture length gives rise to a greater depressurisation effect. Therefore, the length of the aperture (i.e. the length of the nozzle) is typically less than 2 cm, for example less than 1.5 cm, preferably 1 cm or less. In examples below, the nozzle is about 1 cm.

The liquid dispersion of the 3D material particles may be highly pressurised, such as up to a pressure of 350 MPa or up to 400 MPa. Exfoliation may however also occur using starting pressures as low as 100 MPa. Typically, the liquid dispersion is pressurised up to a pressure of at least 120 MPa, for example at least 150 MPa, preferably at least 200 MPa. The liquid dispersion may be pressurised by use of known devices, e.g. a suitable pump, such as an intensifier pump.

As discussed above, in addition to the shear forces imparted on the dispersion via depressurisation, shear forces can also be created by forming first and second flowpaths of the dispersion in opposite directions.

In embodiments of the invention, illustrated in an example below in more detail, shear forces generated as a result of contact between material in the first and second (reverse) flowpaths result in exfoliation of the 3D layered materials in the dispersion, the material in the dispersions including both the 3D layered material and also any solvent or surfactant that may be present (see below).

It is preferred that the respective flowpaths are reverse and aligned so as to be in contact with each other while not impacting head on. Separate flowpaths can, for example, be generated substantially opposite each other and partially overlapping but not coaxially aligned. The first and second flowpaths may impact each other via a glancing blow and/or along a part of the length of the flow. The flowpaths may be directed so as to make contact with each other but not be directly opposed to each other. As illustrated in an example below, one flowpath may be reversed so that the reversed flow forms the opposing flowpath contacting the first but not directly impeding it.

The flow of the dispersion along one or both of the flowpaths may be in the form of pressurised jets. The term "jet" as used herein refers to a narrow stream (generally less than 1 cm in diameter, but typically much less than 1 cm in the context of the present invention) of fluid discharged from an opening or nozzle. The step of passing the high-pressure dispersion through an aperture (such as a nozzle) may simultaneously depressurise the dispersion and form the flow, typically as a high velocity jet.

In one example of the invention, the flow of the dispersion along the first flowpath and the flow of the dispersion along the second flowpath are both jets formed from two different nozzles. The first nozzle may be arranged to direct a first flow along a first flowpath whilst the second nozzle is arranged to direct a second flow along a second flowpath, wherein the second flow path is substantially reverse but non-coaxial to the first flowpath. In this example, the materials in the first flowpath contact the materials in the second flowpath as they pass each other.

Alternatively, the two opposing flows can be formed from a jet from a single nozzle which impacts a surface (e.g. a wall or a baffle) for reversing the flow of the jet in a direction substantially reverse to the jet. This impact forms a flow of the dispersion along a second flowpath which is substantially reverse to the jet of the dispersion along the first flowpath. Again, contact of the flows results in shear, causing exfoliation.

The surface off which the jet is reflected may be a baffle or an end wall of the chamber. Typically, the baffle or wall is orthogonal to the direction of the jet.

By reflecting the jet of the dispersion, the direction of fluid flow within the chamber is reversed. This results in the relative shear velocity of the fluid travelling towards and/or away from the end wall being increased. These shear forces act on the dispersion and result in exfoliation of the 3D layered material to form few-layer and/or monolayer nanoplatelets.

In an example of the invention, the pressurised dispersion is passed through a nozzle arranged to form a pressurised jet of the dispersion in the chamber and directed towards a baffle or end wall of the chamber.

The invention also provides apparatus for exfoliating 3D layered materials to form 2D nanoplatelets, the apparatus comprising:

a decompression chamber;

a reservoir for a dispersion of the 3D layered material;

a pressurizer capable of pressurising the dispersion to 100 MPa or above;

a conduit from the reservoir exiting into the chamber at a chamber high-pressure inlet (e.g. a nozzle);

a low-pressure outlet from the chamber for exit of exfoliated material; and a baffle within the chamber comprising a substantially flat wall;

wherein the inlet is adapted to form in use a jet of the dispersion exiting from the reservoir via the inlet and directed at the baffle along an axis orthogonal to the baffle wall.

Shear forces are created (as described above) through depressurisation of the pressurised dispersion as it enters the decompression chamber and also through interaction of the jet travelling towards the baffle wall with fluid reflected off the baffle wall. Additional shear forces may be generated in the dispersion through interaction between the dispersion and the interior walls of the decompression chamber and also through impact of the jet of the dispersion with the baffle wall. This results in a cumulative and increased level of exfoliation and thus an improved yield of nanoplatelets.

Typically, the high-pressure inlet in the apparatus is a nozzle, as described herein.

The invention provides a continuous method of and apparatus for producing nanoplatelet materials at a throughput rate of greater than 20 L/hr and at comparable conversion rates to the system described in WO 2017/060497.

The term "nanoplatelets" as used herein refers to nanoparticles which consist of small stacks of a layered 2D material (e.g. graphene, boron nitride, or 2D transition metal dichalcogenides). The nanoplatelets typically have a thickness of less than 30 nm, for example less than 20 nm. The term "thickness" as used herein refers to the dimension of the nanoplatelets along the axis of stacking of the layers within the nanoplatelets (see FIG. 6). The terms "length" and "width" refer to the longer and shorter dimensions of the nanoplatelets along perpendicular axes in the plane of the sheets of the layered materials respectively.

The term "few-layer" nanoplatelets refers to nanoplatelets having 20 or fewer layers, preferably 10 or fewer layers.

Nanoplatelets that can suitably be prepared by the exfoliation method of the present invention include graphene, graphene oxide, reduced graphene oxide, borophene, germanene, silicene, stanene, phosphorene, bismuthene, hexagonalboron nitride (h-BN), MXenes, 2D perovskites and transition metal dichalcogenides (TMDs).

Transition metal dichalcogenides (TMDs) have the chemical formula $MX_2$, wherein M is a transition metal and X is a chalcogen (i.e. sulphur, selenium or tellurium). Examples of TMDs include molybdenum disulphide ($MoS_2$), molybdenum diselenide ($MoSe_2$), molybdenum ditelluride ($MoTe_2$), niobium diselenide ($NbSe_2$), tungsten disulphide ($WS_2$), tungsten diselenide ($WSe_2$) and hafnium disulphide ($HfS_2$).

MXenes consist of a few layers of transition metal carbides, nitrides or carbonitrides which are a few atoms thick. Examples of these include $Ti_2C$, $V_2C$, $Nb_2C$, $Mo_2C$, $Ti_3C_2$, $Ti_3CN$, $Zr_3C_2$, $Hf_3C_2$, $Ti_4N_3$, $Nb_4C_3$, $Ta_4C_3$, $Mo_2TiC_2$, $Cr_2TiC_2$ and $Mo_2Ti_2C_3$.

Preferably, the 3D layered material is graphite and hence the nanoplatelets formed are graphene nanoplatelets.

The process comprises forming a dispersion of the 3D material to be exfoliated. The method of forming a dispersion typically involves mixing the 3D material in a suitable solvent. Examples of 3D materials include those listed above. The 3D materials may have an average particle size (as typically measured by a combination of Atomic Force Microscopy, Scanning Electron Microscopy, Dynamic Light Scattering and Powder Laser Diffraction) of at least 1 μm, typically at least 2 μm, for example at least 3 μm, such as at least 5 μm. In addition, the 3D materials may have an average particle size of up to 50 μm, typically up to 25 μm, for example up to 10 μm.

The solvent in the dispersion may be a polar or non-polar solvent and the most appropriate solvent may depend on the 3D material to be exfoliated. The yield of the process and stability of the dispersions are promoted by matching the surface tension and Hansen parameter of the solvent to nanoplatelets.

The solvent is preferably a polar, aprotic solvent, especially when the 3D material to be exfoliated is graphite. Examples of such solvents include dimethylformamide (DMF), N-methyl-2-pyrrolidone (NMP), tetrahydrofuran (THF), dimethylsulphoxide (DMSO), acetone, dichloromethane DCM), cyclohexanone and cyclopentanone. Due to their relatively low boiling points, low toxicity and suitability for emulsification with water for subsequent processing cyclohexanone and cyclopentanone are preferred solvents. Alternatively, the solvent may be a polar protic solvent (e.g. water or iso-propanol). When the solvent is water, a surfactant may also be included. The surfactant may be ionic or non-ionic and again the choice of surfactant may vary with the choice of 3D material to be exfoliated. The surfactant may be present in the dispersion at a concentration of between 0.1 g/L to 10 g/L. Examples of surfactants that could be used include Triton X-100 and sodium cholate. Suitable solvent systems for forming dispersions of graphene are readily available to the person skilled in the art (see for example, WO 2017/089987).

The concentration of the 3D material in the dispersion may be at least 1 g/L, typically at least 10 g/L, preferably at least 15 g/L, such as at least 20 g/L. For example, the concentration of the 3D material in the dispersion may be at least 40 g/L, for example approximately 45 g/L. Concentrations of above 60 g/L are typically avoided as this can make downstream separation processes more difficult.

Methods for preparing dispersions are well-known to the person skilled in the art and may involve simply mixing the particles of the 3D material into the solvent.

When the inlet takes the form of a nozzle, the nozzle is typically formed from a ceramic material, such as zirconia (zirconium dioxide, $ZrO_2$). Alternatively, the nozzle may be formed from diamond. Zirconia and diamond are particularly advantageous due to their hardness (and therefore reduced wear on the nozzle) as well as their tendency to have "flawless" surfaces (which reduce turbulence within the dispersion).

The inlet comprises a narrow opening through which the pressurised dispersion passes in order to enter the depressurisation chamber. The opening may be circular in shape. When the opening is circular, the opening may have a diameter of from 50 μm to 250 μm, typically from 70 μm to 150 μm, for example from 90 μm to 130 μm. Accordingly, the diameter of the circular opening may be around 100 μm.

The dispersion is fed into the decompression chamber through the high-pressure inlet. Due to the pressure of the dispersion passing through the inlet and the size of the inlet, the dispersion exits the inlet and into the depressurisation chamber at high velocity, e.g. a velocity of greater than 1,000 m/s (for example, up to 10,000 m/s).

The chamber may also be made from a ceramic material (such as zirconium) or diamond.

The chamber is typically cylindrical in shape. The chamber may have a diameter of at least 200 μm, for example at least 300 μm, preferably at least 500 μm or at least 700 μm. The diameter of the chamber is typically 1500 μm or less, for example 1200 μm or less, preferably 1000 μm or less or 800 μm or less. Accordingly, the diameter of the chamber may be from 200 μm to 1200 μm, for example from 300 μm to 1000 μm, preferably from 500 μm to 800 μm. Increasing the diameter of the chamber increases the throughput of the apparatus. However, a smaller diameter maximises the area of interaction between the jet of the dispersion travelling towards the baffle and the reflected dispersion in order to increase the shear forces generated and therefore the nanoplatelet yield. Therefore, the diameter may of the chamber may be selected depending on the throughput and yield required.

The length of the chamber is typically greater than 50 mm, for example greater than 90 mm.

In an example (described further herein) the chamber is connectable at a first end to the nozzle. In other words, the chamber is arranged so that is downstream and in fluid communication with the nozzle. The chamber is also typically provided at a second end (i.e. the end opposite to the first end) with an end wall. The end wall reflects the jet back towards the nozzle. As the reflected jet travels back from the end wall towards the nozzle, it interacts with the jet that is travelling from the nozzle to the end wall. This causes shear forces at the interfaces between the two jets, which causes exfoliation of the 3D layered material within the dispersion.

The end wall may form part of the chamber (i.e. it may be integrally formed with the circular wall of the chamber) or alternatively may take the form of a plug which is connectable to the second end of the chamber. The plug may be connectable to the second end of the chamber by means of a push-fit or screw-fit connection.

The chamber also has a low pressure outlet through which the (at least partially) exfoliated dispersion can exit the chamber. Typically, the outlet is located at or near the first end of the chamber (i.e. the end of the chamber where the nozzle is situated). This maximises the time the jet of the dispersion spends in the chamber as it passes from the nozzle, along the length of the chamber to the end wall and then back along the chamber to the outlet (near the nozzle). Maximising the time in the chamber increases flow on flow contact and hence the shear forces that act on the 3D layered materials to exfoliate them and thereby increases the yield of nanoplatelets.

The processes described above typically notably increase the temperature of the dispersion (typically by 30° C. or greater) through frictional forces acting on the dispersion. However, it has been found that the yield of nanoplatelets can decrease as the temperature of the dispersion increases. Therefore, it is an optional feature of the invention for fluid exiting the chamber via the outlet to be passed through a heat exchanger. This reduces the temperature of the exiting fluid. The fluid may then optionally be recirculated to the aperture (e.g. nozzle) in order to increase the yield of the nanoplatelets or processed to harvest exfoliated material. 5 or more, 10 or more, 15 or more and even 20 or more passes can be used; in examples described below in more detail yield increased with increasing number of passes.

Accordingly, the processes described herein are typically conducted at temperatures of from 5° C. to 30° C., for example from 12° C. to 20° C.

The apparatus of the invention may therefore include a heat exchange downstream of the low-pressure outlet for cooling of material exiting the decompression chamber. The apparatus may also comprise a conduit connecting the low-pressure outlet and the reservoir or high-pressure inlet for recirculating the dispersion to increase the yield of nanoplatelets.

Alternatively, the fluid liquid can proceed to a downstream processing step, e.g. where nanoplatelets can be separated from the solvent and/or residue 3D layered materials in the dispersion. The downstream processing step may therefore be a separation step involving centrifuging or filtering fluid in which exfoliation has taken place.

The apparatus may separately or additionally comprise a heat exchanger to reduce the dispersion temperature in or entering the reservoir, hence reducing its temperature prior to the heating effects of the method; the starting temperature is generally controlled or reduced to 20° C. or below, 15° or below or preferably 10° C. or below.

The methods described above may generate a mixture of unexfoliated layered material, partially exfoliated layered material and exfoliated material in a range of sizes. The methods described above may therefore also comprise a size selection step in order to separate out exfoliated material of a particular size. The size selection step may be a centrifugation step wherein the dispersion obtained from the methods described above is subjected to centrifugal force in order to separate the components of the mixture by their weight. For example, the size selection step may involve centrifuging the output dispersion (from the methods described above) for a relative centrifugal force—time product of from 2000 g·min to 5000 g·min. The size selection step may result in isolation of nanoplatelets having a lateral length of from 0.5 μm to 1.5 μm, for example from 0.7 μm to 1.2 μm.

The invention also provides an apparatus as described herein adapted to carry out a method described herein as well as a method of exfoliating 3D layered materials by passing the dispersion through an apparatus described herein.

The invention further provides 2D nanoplatelets (e.g. graphene) obtained by the methods/processes described herein.

BRIEF DESCRIPTION OF THE DRAWINGS

The invention is now illustrated in specific examples and with reference to the accompanying drawings in which.

DETAILED DESCRIPTION OF THE INVENTION

Figure 1:
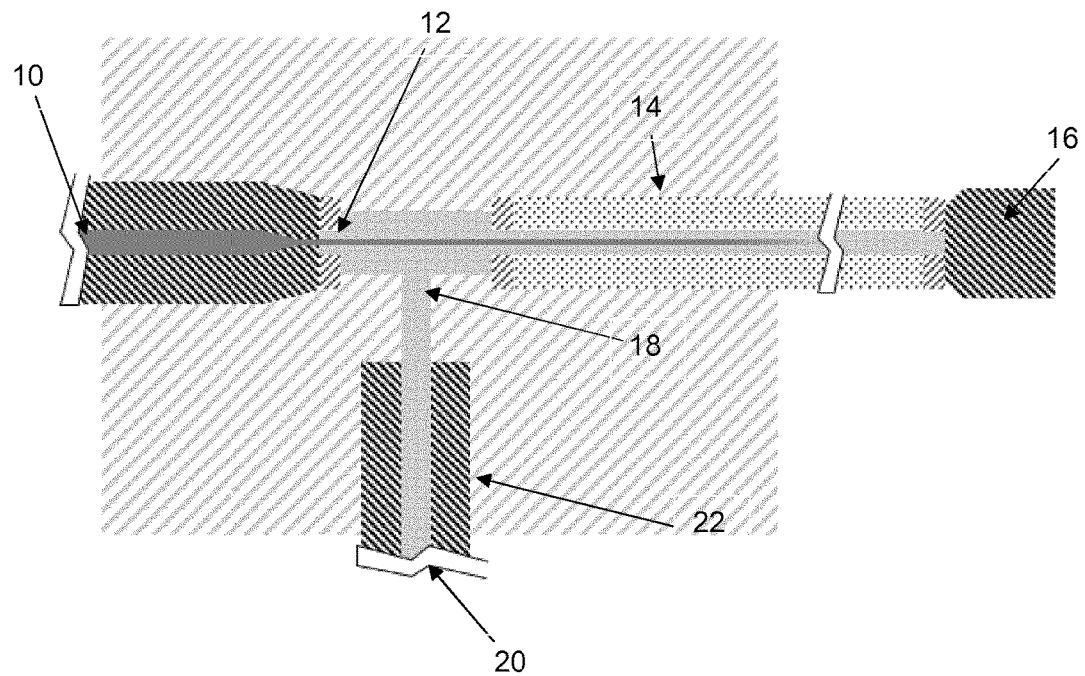
FIG. 1 shows a schematic diagram of a liquid jet homogeniser for use in carrying out the process of the invention.

FIG. 1 shows a liquid jet homogeniser for use in carrying out the process of the invention. Examples of suitable liquid jet homogenisers include those obtained from BEE International.

The apparatus comprises a fluid inlet (10) which is connected to or part of a pressurised reservoir of the dispersion of the 3D material to be exfoliated. The fluid inlet (10) leads to a diamond nozzle (12) having a circular opening at its apex with a diameter of 100 μm.

Downstream of the nozzle (12) is an exfoliation chamber (14). The exfoliation chamber (14) is formed from a plurality (e.g. 11) reactors (also supplied by BEE International) placed in series. Each reactor is 10 mm long and the total length of the exfoliation chamber (14) is therefore 120 mm. Annular seals are inserted between each reactor, made of a polymer (e.g. PTFE) with approximate dimensions of 1 mm thick (contributing ca 10 mm to the total reactor length), inner diameter of 3 mm, and outer diameter matching that of the reactors themselves. The internal diameter of the chamber (14) using this particular equipment can be selected from about 300, 500, 750 and 1000 μm by selection of the appropriate reactors.

At the distal end of the exfoliation chamber (i.e. the opposite side to the nozzle (12)) is located an end plug (16) forming an end wall. The end plug is a solid stainless-steel plug. The plug is a screw-fit NPT fitting, with a blank face perpendicular to the axis of the reactor chamber (and therefore the flowing fluid, also).

There is also a low pressure opening (18), an NPT fitting with an internal diameter of 3.125 mm, at the nozzle-end of the chamber which leads to a fluid outlet (20). The fluid outlet delivers a dispersion comprising 2D nanoplatelets along with any residual 3D materials. The output fluid can then either be recirculated through the apparatus to increase the yield of 2D nanoplatelets or proceed to a downflow processing step (e.g. an isolation step in order to recover the obtained nanoplatelets).

The shear forces generated as the fluid jet passes through the apparatus may generate frictional heat to increase the temperature of the fluid. The fluid may therefore, having left the chamber (14) through opening (18), be passed through a heat exchanger (22) before exiting through outlet (20).

Pressurised fluid jet enters the chamber (14) through the nozzle (12) and is directed toward the end plug (16) at the distal end of the chamber (14). As the fluid jet exits the nozzle, the pressure of the fluid drops which results in shear forces being generated in the fluid. When the jet hits the end plug (16), the direction of fluid flow is reversed by reflection off the end plug (16). The continuous feed of pressurised fluid entering the chamber (14) results in the reflected fluid being driven back along the chamber (14) in the direction of the nozzle (12) and opening (18) at radially outer regions of the chamber (14). Shear forces result from depressurisation of the fluid as it exits the nozzle and also between the radially inner, pressurised fluid jet approach the end plug (16) and the radially outer reflected fluid and cause exfoliation of the 3D layered material.

The outlet (20) delivers a dispersion comprising 2D nanoplatelets along with any residual 3D materials. The output fluid can then either be recirculated through the apparatus to increase the yield of 2D nanoplatelets or proceed to a downflow processing step (e.g. an isolation step in order to recover the obtained nanoplatelets).

The shear forces are generated as the fluid jet passes through the nozzle (12) and depressurises. These shear forces cause exfoliation of the 3D layered material to form 2D nanoplatelets. The apparatus is capable of flow rates of up to 20 L/hour.

Figure 2:
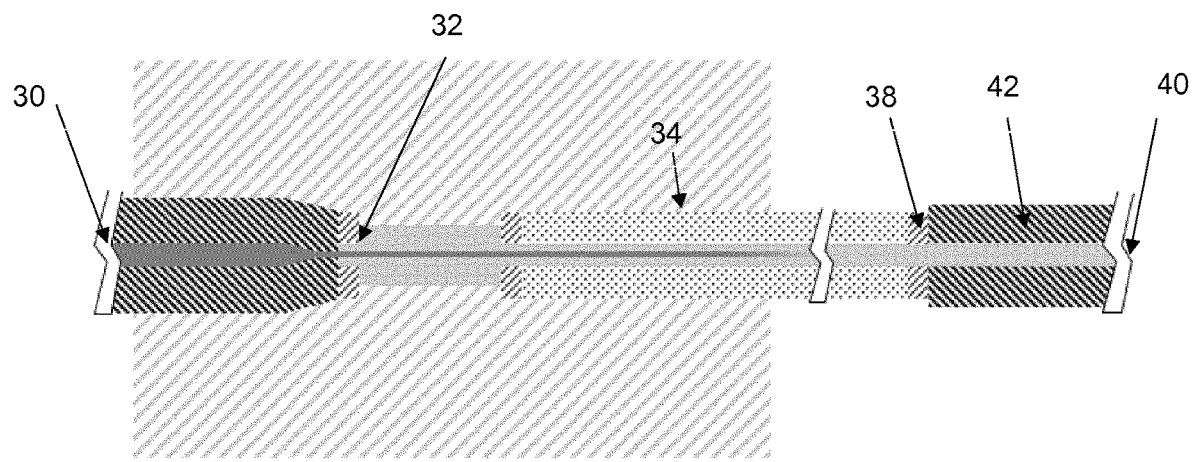
FIG. 2 is a schematic diagram showing the fluid flow of the dispersion inside the chamber.

FIG. 2 shows a liquid jet homogeniser for use in carrying out the process according to another embodiment of the invention.

The apparatus comprises a fluid inlet (30) which is connected to or part of a pressurised reservoir of the dispersion of the 3D material to be exfoliated. The fluid inlet (30) leads to a diamond nozzle (32) having a circular opening at its apex with a diameter of 100 μm.

Downstream of the nozzle (32) is an exfoliation chamber (34). The exfoliation chamber (34) is formed from a plurality (e.g. 11) reactors placed in series. The internal diameter of the chamber (34) can be selected as noted before by selection of the appropriate reactors.

Downstream of the exfoliation chamber (34) is low pressure outlet (38) which leads to a heat exchanger (42) having an outlet (40).

The outlet (40) delivers a dispersion comprising 2D nanoplatelets along with any residual 3D materials. The output fluid can then either be recirculated through the apparatus to increase the yield of 2D nanoplatelets or proceed to a downflow processing step (e.g. an isolation step in order to recover the obtained nanoplatelets).

The shear forces are generated as the fluid jet passes through the nozzle (32) and depressurises. These shear forces cause exfoliation of the 3D layered material to form 2D nanoplatelets.

Example 1

A liquid dispersion of graphite is prepared by mixing graphite particles having an average diameter of 6 μm (as obtained from various sources e.g. from Kibaran (Australia) who have a mine in Tanzania; alternative sources have be used and we have found our processes fairly robust in terms of yield vs starting material) in cyclohexanone or cyclopentanone to form a dispersion having a graphite concentration of 45 g/L.

The liquid dispersion of graphite is pressurized up to 3000 bar (300 MPa) by use of an intensifier pump and is fed to fluid inlet (10) of the apparatus (as shown schematically in FIG. 1). The liquid dispersion is forced through the nozzle (12) into the exfoliation chamber (14). This accelerates the fluid to form a high velocity jet.

This jet then enters the linear zirconia interaction chamber (14) against a reverse flow displaced by the impinging fluid. The reverse flowing liquid is forced to exit the chamber near the nozzle; this maximises the interaction time with the jet. Frictional heating occurs within the chamber to increase the temperature of the liquid jet.

The exiting liquid passes through a heat exchanger and is then either recirculated into the process to increase the yield, or proceeds to a downflow processing step.

Once the graphite has been processed, the dispersion was centrifuged at 5000 g for 20 minutes to remove all unexfoliated crystallites and larger fragments. The nanoplatelets obtained are less than 10 layers thick and have a length of approximately 1 μm. Accordingly, the invention provides a method of producing graphene nanoplatelets with increased lateral sizes. In the lateral direction, the nanoplatelets typically have an aspect ratio (their length divided by their width) is greater than 1 (for example, around 1.5).

Figure 3:
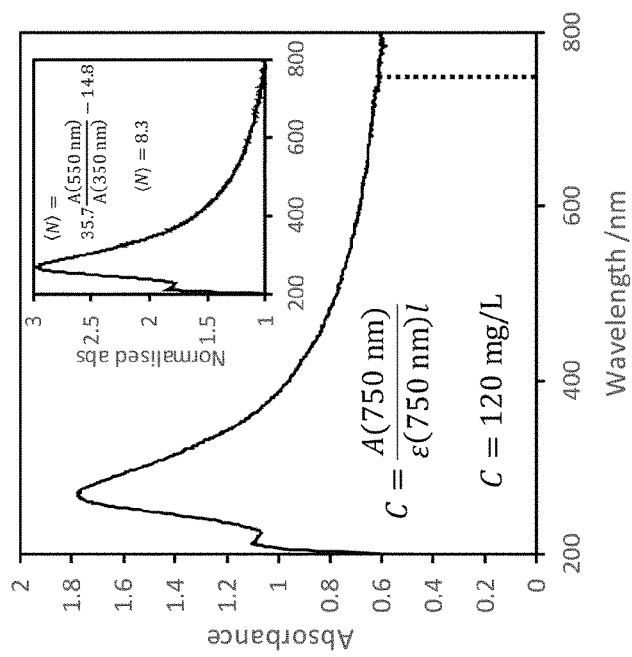
FIG. 3 is a UV-Visible absorption spectrum of a graphene dispersion obtained by the process of one embodiment of the invention.

FIG. 3 is a UV-Visible absorption spectrum of a graphene dispersion obtained by the process of Example 1 described above, showing a measurement of concentration (120 mg/L) and an average layer number (8.3).

Figure 4:
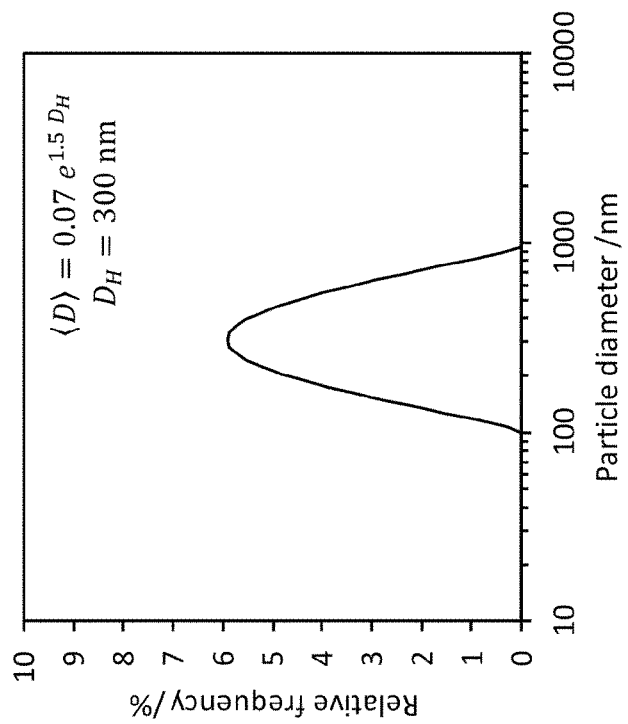
FIG. 4 shows a Dynamic Light Scattering (DLS) particle size analysis graph of the graphene nanoplatelets obtained according to one embodiment of the invention.

FIG. 4 shows a Dynamic Light Scattering (DLS) particle size analysis graph, indicating that the average lateral flake size is approximately 360 nm.

Figure 5:
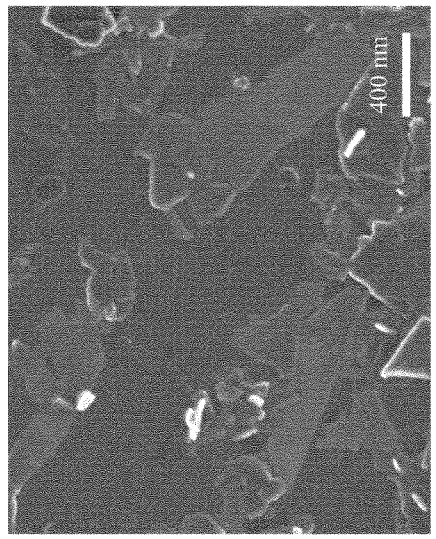
FIG. 5 is a scanning electron micrograph of deposited flakes obtained according to one embodiment of the invention.
Figure 6:
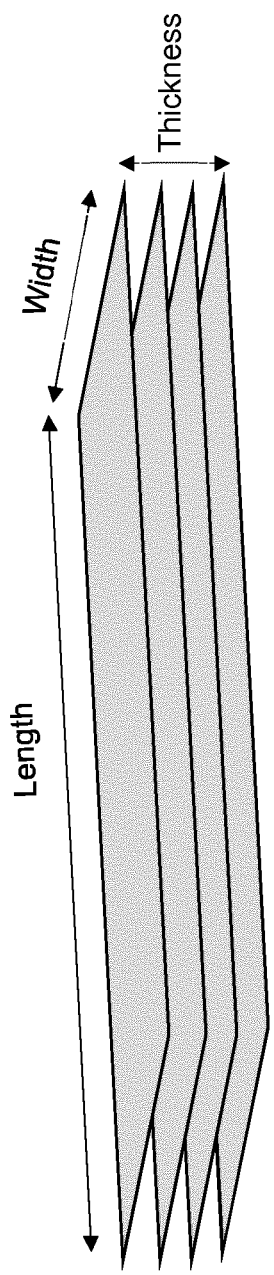
FIG. 6 is a schematic diagram showing respective width, length and thickness parameters of exfoliated material.

FIG. 5 is a scanning electron micrograph of deposited flakes, showing that the particles have a characteristic size comparable to that measured by DLS (see FIG. 4).

Operating Pressure

Figures 7, 8:
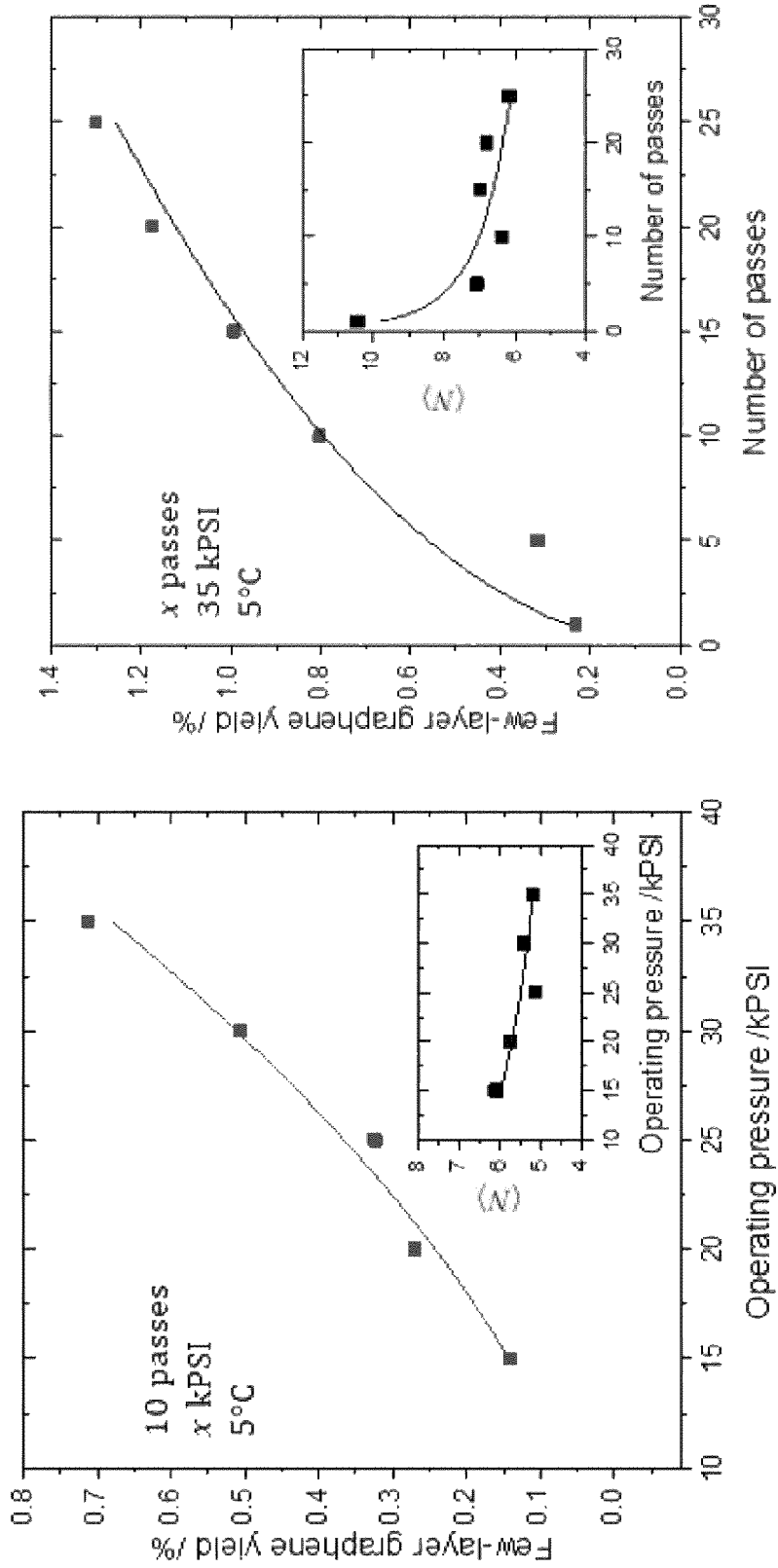
FIG. 7 shows the effect of operating pressure on the graphene yield and the average layer number of the exfoliated graphene particles.
FIG. 8 shows the effect of increasing the number of passes on the graphene yield and the average layer number of the exfoliated graphene particles.

In initial testing of the above-described apparatus, we measured graphene yield and average layer number of the graphene particles against apparatus operating pressure. The results are shown in FIG. 7. The running temperature was set to 5° C. and the dispersion was circulated through the apparatus 10 times.

Yield was acceptable at about 140 MPa and increased from about 140 MPa to peak yields for individual runs at about 200 MPa and about 250 MPa. In excess of 280 MPa yields decreased. The drop in yield for the higher pressure may be due to increasing temperature inside the particular cell used with increasing pressure, affecting the chemical physics of the fluid-graphene interactions. The average layer number was between approximately 5 and 6 for all tested pressures.

Multiple Passes

We also measured yield and average layer number against number of passes of recirculated material. The results are shown in FIG. 8. The temperature was maintained at 5° C. and the operating pressure was set to 35 kPSI (241 MPa). Yield was found to increase steadily up to 20 passes (testing was not continued beyond this number but yields may be capable of further increase), increasing approximately 3-fold when comparing yield after 5 passes with yield after 20 passes. Layer number decreased from greater than 10 to less than 7 after the initial 10 passes.

Operating Temperature

Figure 9:
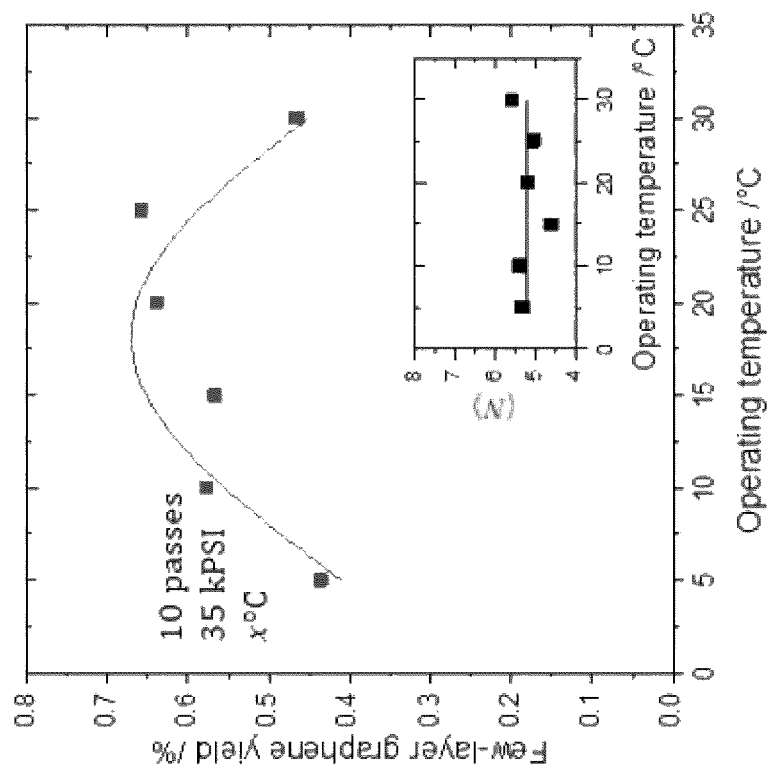
FIG. 9 shows the effect of operating temperature on the graphene yield and the average layer number of the exfoliated graphene particles.

The effect of operating temperature on yield and average layer number was also studied) see FIG. 9). The operating pressure was set to 35 kPSI (241 MPa) and the dispersion was passed through the apparatus 10 times. Yield was found to peak at approximately 17° C., before decreasing again. The average layer number appeared to be relatively independent of temperature.

Yields of Exfoliated Material

The apparatus was used for exfoliation of graphene and $MoS_2$ using pressures indicated by previous pressure testing and recirculation of material via multiple passes, giving the following results:

| Material | Pressure (MPa) | Process rate (L/hour) | Speed (g) | Time (min) | Conc. (g/L) | Yield | <N> |
|---|---|---|---|---|---|---|---|
| Graphene | 225 | 1.5 | 5000 | 18 | 0.318 | 2.07% | 8.0 |
| $MoS_2$ | 215 | 1.5 | 5000 | 10 | 0.463 | 2.68% | 5.4 |

(Speed and time refer to configuration parameters used to isolate nonoplatelets from the dispersion; N indicates average no. of layers)

Electrical Conductivity

One issue that affects the applications of few-layer graphene is that deposited films of graphene often have a low electrical conductivity. This is partially a result of significant quantities of adsorbed surfactant or other residues, owing to the high specific surface area of exfoliated nanosheets. Additionally, the small lateral sheet size increases the density of junctions within a film, which contribute centres for charge scattering thereby lowering the network conductivity.

Therefore, selecting larger multilayers yields a higher conductivity in the final deposited films; both for a lower specific surface area (which scales reciprocally with layer number), and a larger lateral sheet size that comes with a well-defined scaling behaviour between layer number and aspect ratio of the nanosheets.

Films were formed from the exfoliated graphene materials by spraying a dispersion of the exfoliated graphene in ethylene glycol onto a mask in order to obtain a film with a conductivity of 8,000 S/m. Upon calendaring, the conductivity increased to 50,000 S/m.

Decompression Alone Versus Decompression Plus Reverse Flow

The apparatus was operated in two different configurations, as per FIG. 1 (referred to as reverse flow) and FIG. 2 (parallel flow) described above.

Yield was higher in the reverse flow configured chamber of FIG. 1, and the relative drop in yield when removing the endstop from the configuration of FIG. 1 was approx. 30%.

Chamber Bore Diameter

We measured yield and average layer number for chamber bores of respectively approx. 500, 750 and 1000 microns. Yield increased slightly and average layer number decreased slightly with decreasing diameter.

Accordingly, the invention provides a method of exfoliating 3D materials to form 2D nanoplatelets.

The invention claimed is:

1. A method of preparing nanoplatelets from a 3D layered material, comprising:
   providing a dispersion of the 3D layered material,
   pressurising the dispersion,
   rapidly depressurising the dispersion by passing the dispersion through a nozzle and into a cylindrical chamber having a length of greater than 50 mm and a diameter of 1200 µm or less to form a first jet of the dispersion along a first flowpath in a first direction, and causing the jet to impact upon a surface in the chamber to change its direction and form a jet in a second flowpath in a second direction substantially reverse to the first flowpath, wherein the second flowpath is substantially reverse and non-coaxial with the first flowpath,
   whereby shear forces between material in the first flowpath and material in the second flowpath exfoliate the 3D layered material into nanoplatelets.

2. A method according to claim 1 wherein the 3D layered material is selected from graphene, graphene oxide, reduced graphene oxide, borophene, germanene, silicene, stanene, phosphorene, bismuthene, hexagonalboron nitride (h-BN), MXenes, 2D perovskites and transition metal dichalcogenides (TMDs).

3. A method according to claim 1 wherein the concentration of the 3D material in the dispersion is at least 15 g/L.

4. A method according to claim 1 wherein the nozzle has an aperture of from 50 µm to 250 µm.

5. A method according to claim 1 wherein the nozzle has a length of less than 2 cm.

6. A method according to claim 1 wherein the chamber has a diameter of 800 µm or less.

7. A method according to claim 1, wherein depressurising the dispersion comprises reducing the pressure by 100 MPa or greater.

8. A method according to claim 1, wherein rapidly depressurising the dispersion comprises reducing the pressure by 100 MPa or greater in a time of less than 1 second.

9. A method according to claim 1, wherein rapidly depressurising the dispersion comprises reducing the pressure by 100 MPa or greater in a time of less than 0.05 seconds.

10. A method according to claim 1, wherein rapidly depressurising the dispersion comprises reducing the pressure by 100 MPa or greater in a time of less than 0.05 milliseconds.

11. A method according to claim 1 wherein the surface of the chamber is an end wall of the chamber.

12. A method according to claim 1 wherein the cylindrical chamber has a length of greater than 90 mm.

13. A method according to claim 1 for exfoliating 3D layered materials to form nanoplatelets, the method comprising:
   causing the jet to impact against a baffle or end wall in the chamber whereby shear forces are created in the dispersion that exfoliate the 3D layered material into nanoplatelets.

14. A method according to claim 13 wherein the baffle or end wall is orthogonal to the direction of the first jet.

\* \* \* \* \*